Figure 1:
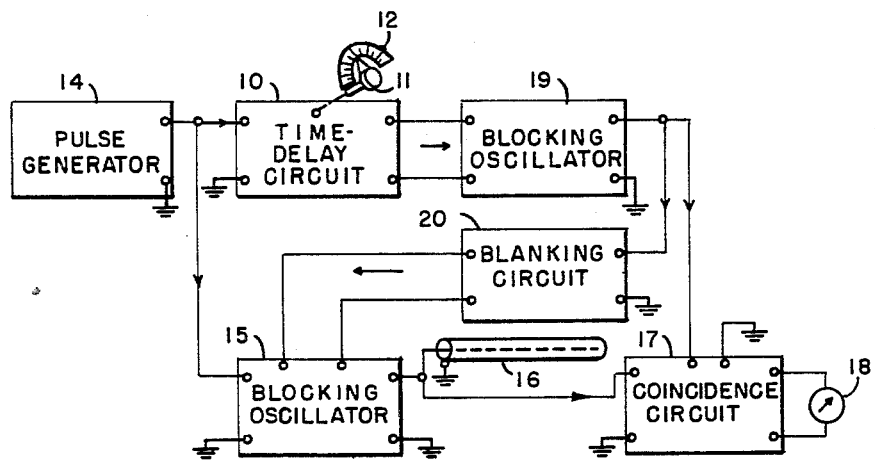

May 31, 1960  C. E. SCHWAB  2,939,075

DELAY CALIBRATING APPARATUS

Filed Aug. 12, 1955

United States Patent Office 2,939,075
Patented May 31, 1960

2,939,075

DELAY CALIBRATING APPARATUS

Carl E. Schwab, Flushing, N.Y., assignor to Hazeltine Research, Inc., Chicago, Ill., a corporation of Illinois Filed Aug. 12, 1955, Ser. No. 527,914

3 Claims. (Cl. 324—57)

General

This invention relates to delay calibrating apparatus and, particularly, to such apparatus for calibrating or recalibrating the time delay of circuits and devices having a variable or adjustable time delay.

It has been heretofore proposed to calibrate the time delay of a time-delay circuit by utilizing a generator for generating standard marker pulses and an oscilloscope for displaying the marker pulses and a pulse translated by the time-delay circuit under test. Such a scheme suffers from several disadvantages. In the first place, errors may be introduced by non-linearity of the oscilloscope sweep as well as other distortion that may be introduced due to the limited band width of the amplifier portions of the oscilloscope. Also, where the delayed pulse from the circuit under test falls midway between successive marker pulses on the oscilloscope, human judgment is required for estimating the exact time delay. In addition, for many applications an oscilloscope is either unhandy or else not available.

It is an object of the invention, therefore, to provide new and improved delay calibrating apparatus which avoids one or more of the foregoing limitations of such apparatus heretofore proposed.

It is another object of the invention to provide new and improved delay calibrating apparatus of relatively simple and inexpensive construction and which does not require the use of an oscilloscope.

In accordance with the invention, apparatus for calibrating a time-delay circuit comprises a time-delay circuit to be calibrated and circuit means for supplying a trigger pulse to the time-delay circuit to be calibrated. The apparatus also includes circuit means responsive to the trigger pulse at the moment it is supplied to the time-delay circuit for developing a series of precisely spaced timing pulses at predetermined intervals after the trigger pulse. The apparatus further includes circuit means responsive to the delayed pulse from the time-delay circuit under test and the series of timing pulses for indicating time coincidence between the delayed pulse and one of the timing pulses, thereby to determine the time delay of the circuit under test.

For a better understanding of the present invention, together with other and further objects thereof, reference is had to the following description taken in connection with the accompanying drawing, and its scope will be pointed out in the appended claims.

Figure 2:
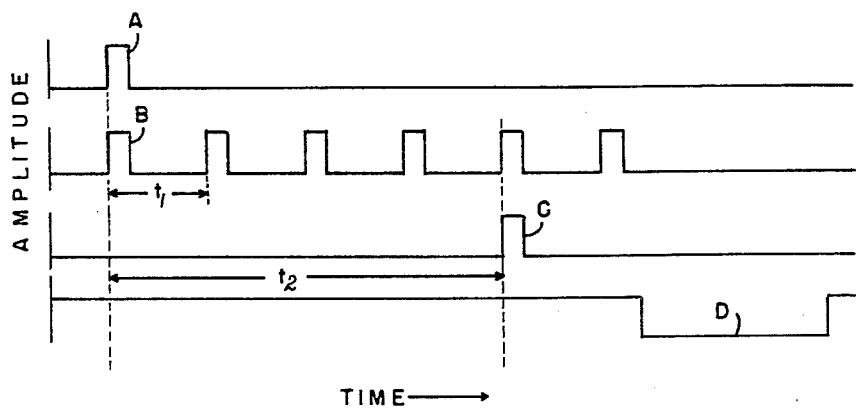

Referring to the drawing:

Fig. 1 is a circuit diagram, partly schematic, of delay calibrating apparatus constructed in accordance with the present invention, and Fig. 2 is a graph representing signals developed at various points of the Fig. 1 apparatus and used in explaining the operation thereof.

Description of delay calibrating apparatus

Referring now to Fig. 1 of the drawing, there is represented apparatus constructed in accordance with the present invention for calibrating a time-delay circuit 10 which may have a suitable control knob 11 for adjusting the time delay thereof and a suitable dial calibration 12 for indicating the setting of the control knob 11. The apparatus of the present invention comprises circuit means for supplying a trigger pulse to the time-delay circuit 10 to be calibrated. Such circuit means for supplying a trigger pulse may be, for example, a pulse generator 14. The delay calibrating apparatus also includes circuit means responsive to the trigger pulse from the generator 14 at the moment it is supplied to the time-delay circuit 10 for developing a series of precisely spaced timing pulses at predetermined intervals after the trigger pulse. Such circuit means may include a pulse generator, as represented by a blocking oscillator 15, which is responsive to the trigger pulse for developing a first timing pulse. Such circuit means may also include a length of transmission line 16, which may be, for example, of the coaxial type, for translating and reflecting each timing pulse for re-triggering the pulse generator 15 to produce a subsequent timing pulse, thereby to develop a series of precisely spaced timing pulses at predetermined intervals after the original trigger pulse from the first-mentioned circuit means represented by generator 14, the spacing between successive timing pulses being equal to the round-trip time delay of the transmission line 16.

The delay calibrating apparatus further includes circuit means responsive to the delayed pulse from the time-delay circuit 10 under test and the series of timing pulses for indicating time coincidence between the delayed pulse and one of the timing pulses, thereby to determine the time delay of the circuit 10 under test. Such circuit means may include, for example, a coincidence circuit 17 and a meter 18 coupled to the output terminals thereof.

The delay calibrating apparatus may also include a blocking oscillator 19 which is responsive to the delayed pulse from the delay circuit 10 for generating a pulse of fixed amplitude and shape which is coincident in time with the delayed pulse from the delay circuit 10 to enable the pulse which is supplied to the coincidence circuit 17 to have an amplitude and shape which is independent of any distortion that may be introduced by the delay circuit 10. This blocking oscillator 19 is optional and its use depends on the amount of distortion introduced by the delay circuit 10 and the degree of precision that is required of the calibrating apparatus.

The delay calibrating apparatus also includes a blanking circuit 20 which is responsive to the delayed pulse from the blocking oscillator 19 for developing a blanking signal for disabling the operation of the blocking oscillator 15 in order to enable such oscillator to be in the proper condition for the next cycle of operation.

The units 10 and 14–20, inclusive, taken individually and without reference to their function in the present system, may be of conventional construction and operation so that a detailed description and explanation of the operation thereof are unnecessary herein.

Operation of delay calibrating apparatus

Considering the operation of the delay calibrating apparatus just described, such apparatus is intended to be used for obtaining either the initial calibration or a recalibration of a delay circuit such as the time-delay circuit 10. To this end, the pulse generator 14 supplies a trigger pulse such as that represented by curve A of Fig. 2 to both the time-delay circuit 10 under test and the blocking oscillator 15. With regard to Fig. 2, it will be noted that the curves represent only one cycle of operation for the calibrating apparatus and that in most apparatus the operation of the apparatus will be repetitive, subsequent cycles of operation being similar to that represented by the Fig. 2 curves.

In response to the trigger pulse represented by curve A, the blocking oscillator 15 generates a first timing pulse as represented, for example, by the first pulse of curve B of Fig. 2. This pulse is supplied to the transmission line 16 and after translation thereby is reflected off of the open circuit at the far end thereof and, hence, supplied back to the blocking oscillator 15. When this first pulse returns to the blocking oscillator 15, it serves to produce a second timing pulse which, in turn, is supplied to the transmission line 16 and is reflected back to retrigger the blocking oscillator 15 to produce a third timing pulse. This process serves to produce the series of precisely spaced timing pulses, as represented by curve B, and continues until the blocking oscillator 15 is disabled as will be mentioned hereinafter. The time interval $t_1$ between successive timing pulses is determined by the round-trip time delay of the transmission line 16.

In response to the trigger pulse represented by curve A, the delay circuit 10 subsequently produces a delayed output pulse such as that represented by curve C of Fig. 2, the interval of time delay $t_2$ being determined by the delay setting of control knob 11. This delayed pulse serves to trigger the blocking oscillator 19 and thereby to produce a corresponding pulse at the output terminals thereof which is of uniform and fixed shape and amplitude. This pulse at the output of the blocking oscillator 19 is time coincident with the delayed pulse from the delay circuit 10 and, hence, may also be considered as the delay pulse.

The delayed pulse from the blocking oscillator 19 is, in turn, supplied to the coincidence circuit 17 as are the series of precisely spaced timing pulses from the blocking oscillator 15. The control knob 11 of the time-delay circuit 10 is now adjusted until the meter 18 gives a maximum indication. This maximum indication indicates that the delayed pulse from the blocking oscillator 19, as represented by curve C, is exactly coincident in time with one of the timing pulses as represented by curve B from the blocking oscillator 15. Thus the time of occurrence of the delayed pulse and, hence, the time delay of the time-delay circuit 10 is accurately known for this particular delay setting. Where the calibrating apparatus is being used to recalibrate a previously calibrated delay circuit 10, then the delay setting of such circuit will readily indicate which one of the timing pulses the delayed pulse is in time coincidence with. As a result, the deviation of the dial setting from the nearest primary calibration mark on the dial 12 indicates the error in the dial calibration for that particular setting. Where the calibrating apparatus is being used to perform the initial calibration on a delay circuit 10, the delay circuit 10 is initially adjusted for zero time delay and the time delay is then gradually increased until the first time coincidence is indicated. This condition then fixes the delay calibration for this setting as it is then known that the delayed pulse is in time coincidence with the first timing pulse appearing after the initial timing pulse. The knob 11 is then adjusted so as to increase the time delay of circuit 10 until the second maximum indication on the meter 18 occurs, this second maximum indicating that the delayed pulse is in time coincidence with the second timing pulse. This process may be continued so as to calibrate the dial 12 at each of the successive points at which time coincidence with a timing pulse is indicated.

The delayed pulse from the blocking oscillator 19 is also supplied to the blanking circuit 20 which, in response thereto, generates a blanking signal, such as represented by curve D of Fig. 2, which is then supplied to the blocking oscillator 15 for disabling the operation thereof for a sufficiently long period of time so as to cause this oscillator 15 to cease from producing timing pulses. This is necessary so that the circuit will be in condition for the next cycle of operation which occurs when the next trigger pulse is supplied by the generator 14.

From the foregoing description of the invention it will be apparent that delay calibrating apparatus constructed in accordance with the present invention represents relatively simple and inexpensive apparatus for calibrating time-delay circuits without need for resorting to the use of an oscilloscope. It will be noted that the time spacing between successive timing pulses is controlled by the rather stable characteristics of a transmission line and, hence, is not readily susceptible to changes or variations with age, temperature, and so forth.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for calibrating a time-delay circuit, the apparatus comprising: a time delay circuit to be calibrated; circuit means for supplying a trigger pulse to the time-delay circuit to be calibrated; circuit means responsive to the trigger pulse at the moment it is supplied to the time-delay circuit for developing a series of precisely spaced timing pulses at predetermined intervals after the trigger pulse; and circuit means responsive to the delayed pulse from the time-delay circuit under test and the series of timing pulses for indicating time coincidence between the delayed pulse and one of the timing pulses, thereby to determine the time delay of the circuit under test.

2. Apparatus for calibrating a time-delay circuit, the apparatus comprising: circuit means for supplying a trigger pulse to the time-delay circuit to be calibrated; a pulse generator responsive to the trigger pulse at the moment it is supplied to the time-delay circuit for developing a first timing pulse; a length of transmission line for translating and reflecting each timing pulse for retriggering the pulse generator to produce a subsequent timing pulse, thereby to develop a series of precisely spaced timing pulses at predetermined intervals after the original trigger pulse from the first-mentioned circuit means, the spacing between successive timing pulses being equal to the round-trip time delay of the transmission line; and circuit means responsive to the delayed pulse from the time-delay circuit under test and the series of timing pulses for indicating time coincidence between the delayed pulse and one of the timing pulses, thereby to determine the time delay of the circuit under test.

3. Apparatus for calibrating a time-delay circuit, the apparatus comprising: a time delay circuit to be calibrated; circuit means for supplying a trigger pulse to the time-delay circuit to be calibrated; circuit means responsive to the trigger pulse at the moment it is supplied to the time-delay circuit for developing a series of precisely spaced timing pulses at predetermined intervals after the trigger pulse; and a coincidence circuit responsive to the delayed pulse from the time-delay circuit under test and the series of timing pulses for indicating time coincidence between the delayed pulse and one of the timing pulses, thereby to determine the time delay of the circuit under test.

References Cited in the file of this patent

UNITED STATES PATENTS

| 2,426,989 | De Rosa | Sept. 9, 1947 |
| 2,432,196 | Hershberger | Dec. 9, 1947 |
| 2,496,970 | Wertz | Feb. 7, 1950 |
| 2,532,539 | Counter et al. | Dec. 5, 1950 |
| 2,546,814 | Augustadt | Mar. 27, 1951 |
| 2,626,986 | MacNichol et al. | Jan. 27, 1953 |